(12) United States Patent
Wen et al.

(10) Patent No.: US 8,207,884 B2
(45) Date of Patent: Jun. 26, 2012

(54) APPARATUS FOR DETECTING RADAR SIGNALS AND THE METHOD THEREOF

(75) Inventors: Chun Hsien Wen, Hsinchu County (TW); Chih Kun Chang, Hsinchu County (TW); Jiunn Tsair Chen, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 475 days.

(21) Appl. No.: 12/273,080

(22) Filed: Nov. 18, 2008

(65) Prior Publication Data

US 2009/0262004 A1    Oct. 22, 2009

(30) Foreign Application Priority Data

Apr. 21, 2008   (TW) ............................... 97114456 A

(51) Int. Cl.
*G01S 7/40* (2006.01)
*G01S 13/86* (2006.01)
(52) U.S. Cl. ................ 342/20; 342/52; 342/57
(58) Field of Classification Search .................. 342/20, 342/52, 57
See application file for complete search history.

(56) References Cited

U.S. PATENT DOCUMENTS

| | | | |
|---|---|---|---|
| 4,990,920 A * | 2/1991 | Sanders, Jr. ..................... 342/14 |
| 6,674,403 B2 * | 1/2004 | Gray et al. ..................... 342/463 |
| 6,697,013 B2 * | 2/2004 | McFarland et al. ........... 342/159 |
| 7,155,230 B2 | 12/2006 | Tsien |
| 7,230,566 B2 * | 6/2007 | Theobold et al. .............. 342/159 |
| 7,436,352 B2 * | 10/2008 | Theobold et al. .............. 342/159 |
| 7,466,667 B2 * | 12/2008 | Jones et al. ..................... 370/278 |
| 7,541,973 B2 * | 6/2009 | Fujikawa et al. .............. 342/179 |
| 7,623,060 B1 * | 11/2009 | Chhabra et al. .................. 342/20 |
| 7,701,382 B2 * | 4/2010 | Hansen ............................. 342/52 |
| 8,032,087 B2 * | 10/2011 | Muquet ....................... 455/67.13 |
| 2005/0032524 A1 | 2/2005 | Kruys et al. |
| 2005/0206554 A1 * | 9/2005 | Yamaura .......................... 342/70 |
| 2006/0028376 A1 * | 2/2006 | Theobold et al. .............. 342/159 |
| 2007/0018888 A1 * | 1/2007 | Fujikawa et al. .............. 342/185 |
| 2007/0126622 A1 * | 6/2007 | Nallapureddy et al. ......... 342/92 |
| 2007/0188376 A1 * | 8/2007 | Theobold et al. .............. 342/159 |
| 2008/0037469 A1 * | 2/2008 | Hamilton et al. .............. 370/331 |
| 2008/0100494 A1 * | 5/2008 | Yamaura .......................... 342/20 |
| 2009/0146863 A1 * | 6/2009 | Wen et al. ........................ 342/20 |
| 2009/0160696 A1 * | 6/2009 | Pare et al. ........................ 342/20 |
| 2009/0262004 A1 * | 10/2009 | Wen et al. ........................ 342/20 |
| 2009/0279487 A1 * | 11/2009 | Reumerman et al. .......... 370/329 |
| 2010/0277362 A1 * | 11/2010 | Wen et al. ...................... 342/159 |

OTHER PUBLICATIONS

Ma Wen, Luo Hanwen, "Radar Detection for 802.11a Systems in 5GHz Band", 2005 IEEE.

(Continued)

*Primary Examiner* — John Sotomayor
(74) *Attorney, Agent, or Firm* — WPAT, P.C.; Anthony King

(57) ABSTRACT

A method for detecting radar signals comprises the steps of: receiving signals detected by a master device; receiving signals detected by a slave device; detecting radar pulses from the signals received by the master device; detecting radar pulses from the signals received by the slave device; and determining radar signals by combining the radar pulses detected by the master device and slave device.

16 Claims, 4 Drawing Sheets

OTHER PUBLICATIONS

Taiwanese Office Action dated Jul. 26, 2011 for 09711456, which is a corresponding Taiwanese application, "A Distributed Agent-based Simulation Environment for Interference Detection and Resolution", Accepted to Special issue on Software Agents and Simulation, Simulation, Apr. 2001.

S. Ramaswamy et al., A Distributed Agent-based Simulation Environment for Interference Detection and Resolution, Accepted to Special Issue on Software Agents and Simulation, Simulation, Apr. 2001.

* cited by examiner

APPARATUS FOR DETECTING RADAR SIGNALS AND THE METHOD THEREOF

BACKGROUND OF THE INVENTION

1. Field of the Invention

The present invention relates to an apparatus and method for detecting radar signals, and more particularly to an apparatus and method for collaboratively detecting radar signals.

2. Description of the Related Art

Because the bandwidth adopted by IEEE 802.11 overlaps that used by some radar devices, IEEE 802.11h recommends a Dynamic Frequency Selection (DFS) technique to avoid such frequency conflict. With the DFS technique, when frequency conflicts are detected, the utilized frequency will hop to a conflict-free channel and continue detecting radar signals in order to prevent interference problems.

However, the DFS technique does not provide an available solution of detecting radar signals. IEEE 802.11h recommends stopping signal transmission when radar signals are detected so as to reduce interference signals. However, the above method would largely reduce the throughput of the system and thus has not been embraced by the industry.

M. Wen, L. Hanwen, "Radar detection for 802.11a systems in 5 GHz band," International Conference on Wireless Communications, Networking and Mobile Computing, 2005, pp. 512-514 discloses a radar-detecting algorithm that detects radar signals based on power increasing or decreasing of adjacent sampling signals. However, this method fails when the radio local area network (RLAN) and radar signals are at the same power magnitude.

U.S. Pat. No. 6,697,013 discloses another radar-detecting algorithm that detects radar signals based on correlation among signals, pulse width and zero crossing. However, it amounts to a lot of hardware cost due to conducting comparisons between the real and imaginary parts of the frequency domain and time domain of signals.

SUMMARY OF THE INVENTION

The present invention is applied to a wireless network having a master device as well as a slave device, or, alternatively, a wireless network having a plurality of devices, which collaboratively detects radar signals.

The method for detecting radar signals in accordance with one embodiment of the present invention comprises the steps of: receiving signals detected by a master device; receiving signals detected by a slave device; detecting radar pulses from the signals received by the master device; detecting radar pulses from the signals received by the slave device; and determining radar signals by combining the radar pulses detected by the master device and slave device.

The method for detecting radar signals in accordance with one embodiment of the present invention comprises the steps of: receiving a plurality of signals detected by multiple devices of the wireless network; detecting radar pulses in accordance with the signals received by the multiple devices; and determining radar signals by combining the radar pulses detected by the multiple devices.

The radar detection apparatus in accordance with one embodiment of the present invention comprises a master device and a slave device. The master device is configured to detect radar pulses while receiving wireless signals. The slave device is configured to detect radar pulses while receiving wireless signals. One of the master device and slave device combines collected radar pulses from the other one to determine the presence of radar signals.

BRIEF DESCRIPTION OF THE DRAWINGS

The invention will be described according to the appended drawings in which.

PREFERRED EMBODIMENT OF THE PRESENT INVENTION

Figure 1:
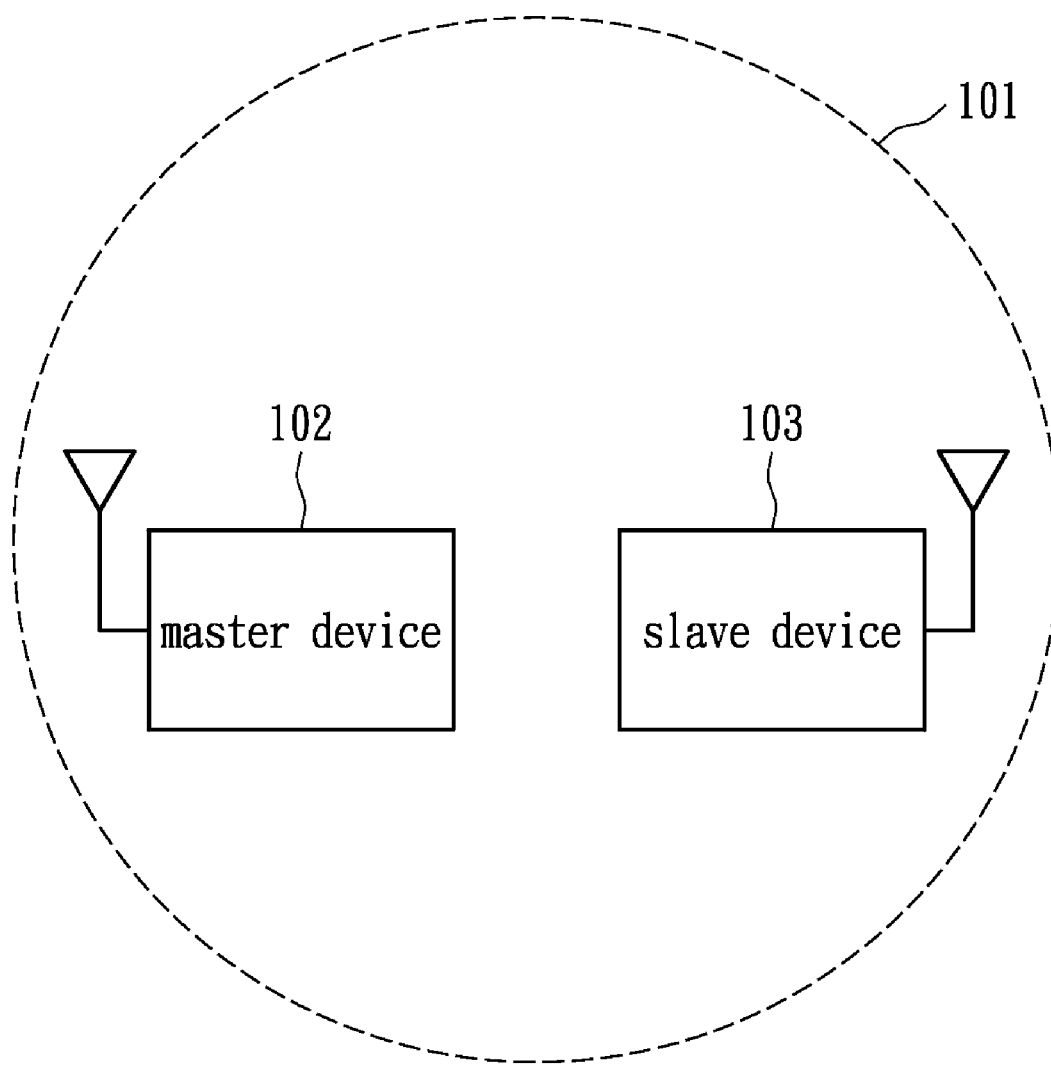
FIG. 1 shows a radar detection apparatus applied to a wireless network in accordance with an embodiment of the present invention.

FIG. 1 shows a radar detection apparatus applied to a wireless network in accordance with an embodiment of the present invention. The radar detection apparatus 101 comprises a master device 102 and a slave device 103. The master device 102 and the slave device 103 possess the function of radar signal detection. The master device 102 performs the actions of detecting radar signals while receiving wireless signals, as does the slave device 103. The master device 102 combines the radar pulses detected by itself and by the slave device 103 to determine the presence of radar signals in the wireless network system.

Figure 2:
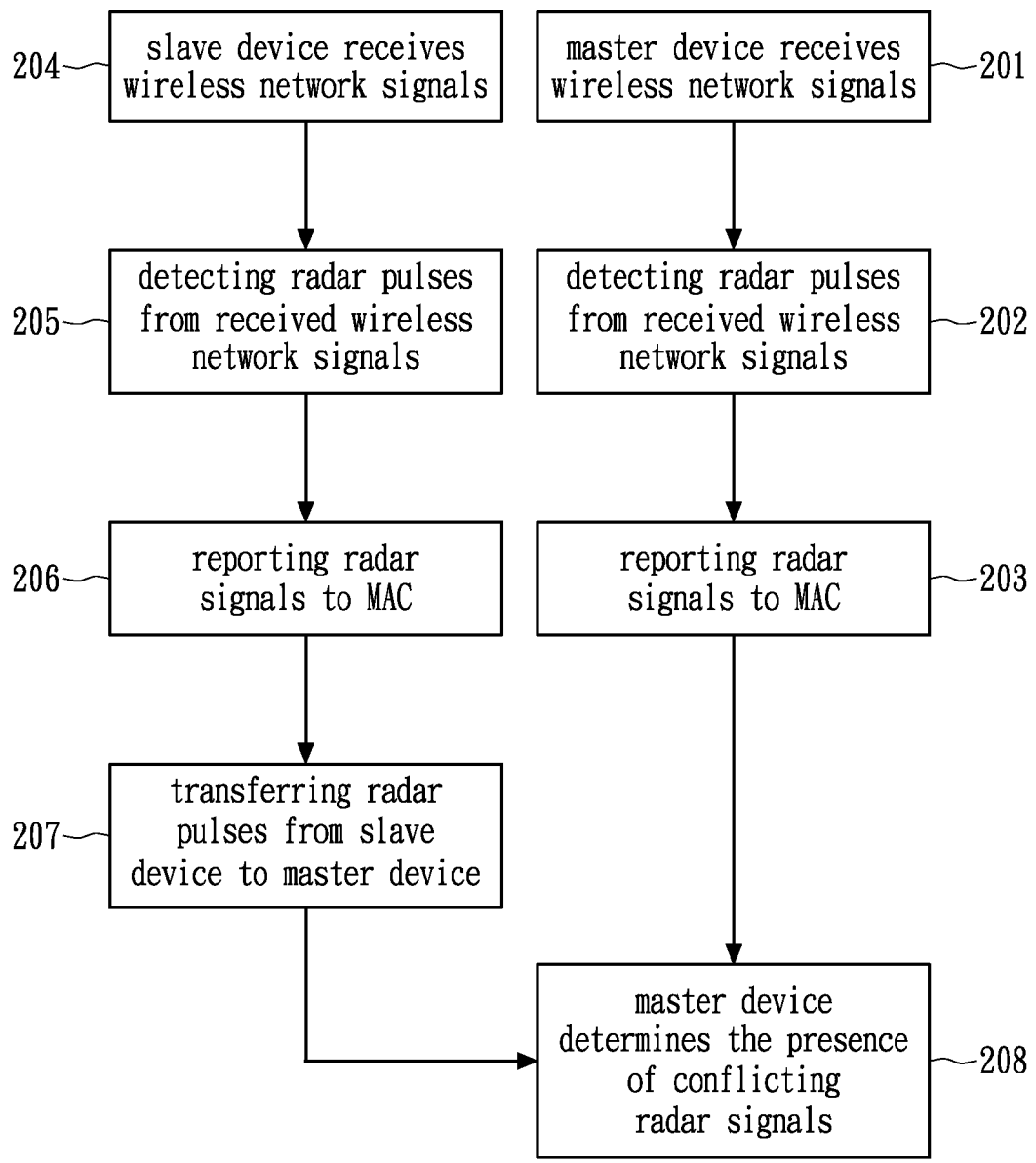
FIG. 2 shows a flowchart of radar detection method in accordance with an embodiment of the present invention.
Figure 3A:
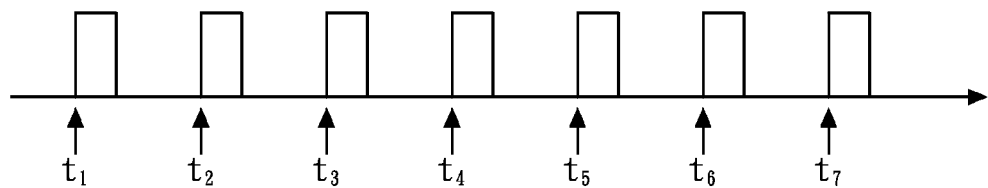
FIG. 3 shows a timing diagram of radar pulses for illustrating the flowchart of the present radar detection method.
Figure 3B:
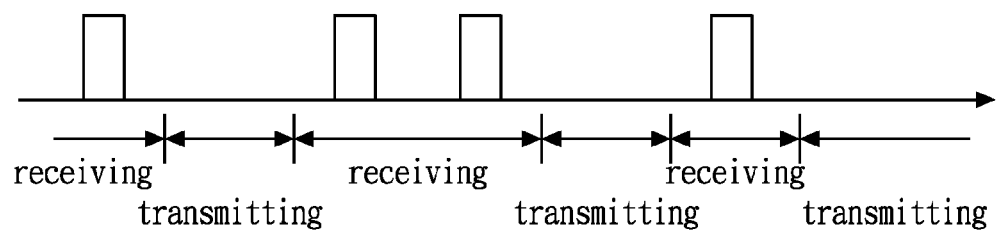
Figure 3C:
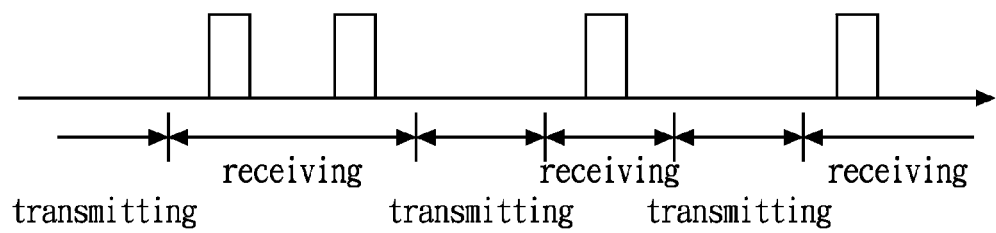
Figure 3D:
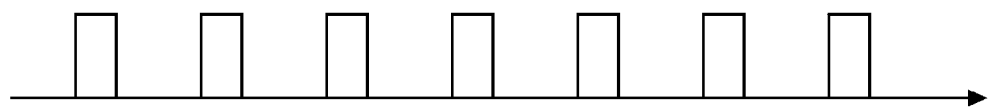

FIG. 2 shows a flowchart of a radar detection method in accordance with an embodiment of the present invention, which is applied to the radar detection apparatus 101. In Step 201, the master device 102 receives wireless network signals. In Step 202, the master device 102 detects radar pulses from the received wireless network signals. In Step 203, the master device 102 reports the data of radar pulses to the Media Access Control (MAC) unit of the master device 102. In Step 204, the slave device 103 receives wireless network signal. In Step 205, the slave device 103 detects radar pulses from the received wireless network signals. In Step 206, the slave device 103 reports the data of radar pulses to the MAC unit of the slave device 103. In Step 207, the slave device 103 transmits collected radar signals disposed in an acknowledgment packet to the master device 102 after replying with an acknowledgement signal. In Step 208, the master device 102 combines the radar pulses collected by itself and by the slave device 103 to determine the presence of the radar signals in the wireless network system.

FIG. 3 shows a timing diagram of radar pulses for illustrating the flowchart of the present radar detection method. FIG. 3A shows a radar signal having seven pulses separately occurring from $t_1$ to $t_7$. FIG. 3B shows radar pulses collected by a master device of the present radar detection apparatus in accordance with one embodiment of the present invention. The master device detects radar signals simultaneously as it receives wireless network signals. In FIG. 3B, four radar pulses are detected. FIG. 3C shows radar pulses collected by a slave device of the present radar detection apparatus in accordance with one embodiment of the present invention. The slave device detects radar signals simultaneously as it receives wireless network signals. In FIG. 3C, four radar pulses are detected. FIG. 3D shows the radar pulses collected by the master device from the master device and the slave device. In the end, the radar detection apparatus determines that there are seven radar pulses in the wireless network during the packet-transmitting period.

Figure 4:
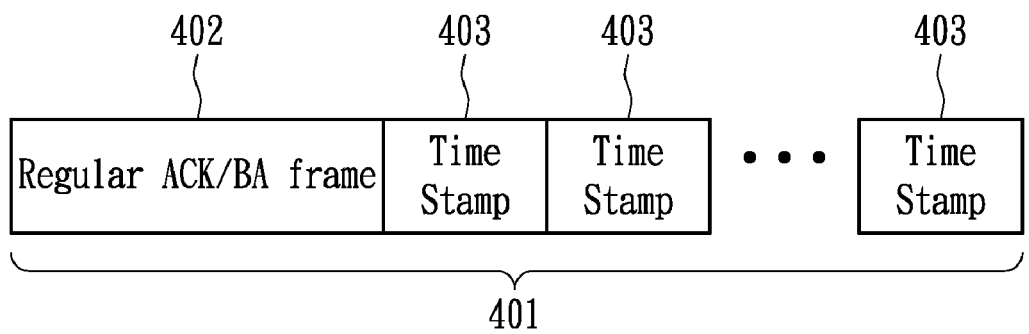
FIG. 4 shows an acknowledgment packet structure in accordance with one embodiment of the present invention.

FIG. 4 shows the structure of an acknowledgment packet in accordance with one embodiment of the present invention. The packet structure follows the definition of IEEE 802.11 and is used to notify the master device that the slave device has completed the receipt of the wireless network packets during the transmission. The regular ACK/BA field 402 of the acknowledgment packet is used to indicate the transmission status. The field 403 of the acknowledgment packet is optional for the definition of IEEE 802.11, and thus is used in this embodiment to contain radar pulses collected by the slave device. The number of the used field 403 indicates the number of radar pulses, and the content of the data indicates the time stamp of the radar pulses.

One embodiment of the present invention utilizes the master device to determine the presence of radar pulses, as the master device collects radar signals detected by both the slave device and itself. Alternatively, the slave device can perform the determination, instead of the master device. In the latter case, the master device transmits collected radar pulses to the slave device first, and then the slave device determines the presence of the radar signals. On the other hand, the authority to determine the presence of the radar signals is up to the MAC unit, and there is no additional hardware cost to handle the signal collected by the slave device. In addition, the master device and slave device detect radar pulses simultaneously while they receive wireless signals. Therefore, the detection covers the whole packet transmission period and the radar coverage rate can approach 100%.

In conclusion, the present invention is suitable to radar detection applied to a wireless network system, especially to an IEEE 802.11 wireless network system.

The above-described embodiments of the present invention are intended to be illustrative only. Numerous alternative embodiments may be devised by persons skilled in the art without departing from the scope of the following claims.

What is claimed is:

1. A method for detecting radar signals, comprising the steps of:
   receiving signals detected by a master device;
   receiving signals detected by a slave device;
   detecting radar pulse information from the signals received by the master device;
   detecting radar pulse information from the signals received by the slave device;
   determining radar signals by combining the radar pulse information detected by the master device and slave device; and
   forwarding the collected radar pulse information from the slave device to the master device after the slave device acknowledges that the radar pulse information has been received.

2. The method of claim 1, further comprising the step of:
   reporting collected data of the radar pulse information to a media access control (MAC) unit of the master device.

3. The method of claim 1, further comprising the step of:
   reporting collected data of the radar pulse information to a MAC unit of the slave device.

4. The method of claim 1, wherein the determining step is determined by the master device.

5. The method of claim 1, wherein the collected radar pulse information is disposed in optional fields of an acknowledgement packet.

6. The method of claim 1, wherein the determining step is determined by the slave device.

7. The method of claim 6, further comprising the step of:
   forwarding the collected radar pulse information from the master device to the slave device after the slave device acknowledges that the radar pulse information has been received.

8. The method of claim 7, wherein the collected radar pulse information is disposed in optional fields of an acknowledgement packet.

9. The method of claim 1, wherein data of the radar pulse information includes timing of the radar pulse information.

10. The method of claim 1, which is applied to an IEEE 802.11 wireless network system.

11. A method for detecting radar signals, comprising the steps of:
    receiving a plurality of signals detected by multiple devices of a wireless network;
    detecting radar pulse information in accordance with the signals received by the multiple devices;
    determining radar signals by combining the radar pulse information detected by the multiple devices; and
    forwarding the collected radar pulse information from one device to another device after acknowledging that the radar pulse information has been received.

12. The method of claim 11, further comprising the step of:
    reporting collected data of the radar pulse information to a media access control (MAC) unit of the wireless network.

13. The method of claim 12, wherein the determining step is determined by the MAC unit.

14. The method of claim 11, which is applied to an IEEE 802.11 wireless network system.

15. A radar detection apparatus applied to a wireless network, the apparatus comprising:
    a master device configured to detect radar pulse information while receiving wireless signals;
    a slave device configured to detect radar pulse information while receiving wireless signals;
    wherein one of the master device and slave device combines radar pulse information collected by the other one to determine the presence of radar signals; and
    wherein the radar pulse information collected by the master device or by the slave device is disposed in optional fields of an acknowledgement packet.

16. The radar detection apparatus of claim 15, which is applied to an IEEE 802.11 wireless network system.

* * * * *